US012133292B2

(12) United States Patent
Borisoglebski et al.

(10) Patent No.: US 12,133,292 B2
(45) Date of Patent: Oct. 29, 2024

(54) NETWORK CONNECTIVITY

(71) Applicant: Truphone Limited, London (GB)

(72) Inventors: Igor Borisoglebski, London (GB); Catarina Pires Mota, London (GB); Victor Manuel Vieira Pinto, London (GB); Scott MacKenzie, London (GB); Frederico Gavinho Lima Dos Santos Dias, London (GB); Michael Moorfield, London (GB); Jorge Manuel Rodrigues Gomes, London (GB); Dmitry Radzevich, London (GB)

(73) Assignee: Truphone Limited, London (GB)

( * ) Notice: Subject to any disclaimer, the term of this patent is extended or adjusted under 35 U.S.C. 154(b) by 290 days.

(21) Appl. No.: 17/707,527

(22) Filed: Mar. 29, 2022

(65) Prior Publication Data

US 2022/0225083 A1 Jul. 14, 2022

Related U.S. Application Data

(63) Continuation of application No. PCT/EP2020/077274, filed on Sep. 29, 2020.

(30) Foreign Application Priority Data

Sep. 30, 2019 (GB) .................................... 1914103

(51) Int. Cl.
*H04W 8/26* (2009.01)
*H04W 4/029* (2018.01)
(Continued)

(52) U.S. Cl.
CPC ........... *H04W 8/265* (2013.01); *H04W 4/029* (2018.02); *H04W 8/183* (2013.01); *H04W 60/00* (2013.01); *H04W 76/10* (2018.02)

(58) Field of Classification Search
CPC ..... H04W 8/265; H04W 4/029; H04W 8/183; H04W 60/00; H04W 76/10; H04W 4/60;
(Continued)

(56) References Cited

U.S. PATENT DOCUMENTS 9,037,112 B2  5/2015 Rajadurai et al.
9,918,220 B1  3/2018 Chastain et al.
(Continued)

FOREIGN PATENT DOCUMENTS

CN  104717646 A  6/2015
CN  108024241 A  5/2018
(Continued)

OTHER PUBLICATIONS

United Kingdom Combined Search and Examination Report dated Mar. 31, 2020 for GB Application No. GB1914103.5.
(Continued)

*Primary Examiner* — Tanmay K Shah
(74) *Attorney, Agent, or Firm* — Whitestone Law, PLLC (57) ABSTRACT

A method is provided which includes receiving location information, performing a selection operation to select an International Mobile Subscriber Identity (IMSI) for obtaining temporary bootstrap connectivity, and attempting to register with a network using the selected IMSI. The selection operation is configured to select one of a first plurality of IMSIs in a first location and one of a second, different, plurality of IMSIs in a second location. Each of the first plurality of IMSIs includes a first predetermined value for at least the first portion of each respective IMSI and each of the second plurality of IMSIs includes a second, different, predetermined value for at least the first portion of each respective IMSI. The selection operation comprises a first and second preconfigured selection characteristic. A network
(Continued)

access element, host device, and network node, according to the method, are also described.

22 Claims, 5 Drawing Sheets

(51) Int. Cl.
*H04W 8/18* (2009.01)
*H04W 60/00* (2009.01)
*H04W 76/10* (2018.01)

(58) Field of Classification Search
CPC ........... H04W 4/02; H04W 8/02; H04W 8/18; H04W 12/06; H04W 88/06; H04L 2101/654
USPC ....................................................... 455/433
See application file for complete search history.

(56) References Cited

U.S. PATENT DOCUMENTS

| 9,940,141 | B2 | 4/2018 | Li et al. |
| 10,231,204 | B2 | 3/2019 | Chastain et al. |
| 2011/0191835 | A1 | 8/2011 | Hawkes et al. |
| 2014/0024361 | A1 | 1/2014 | Poon et al. |
| 2017/0041733 | A1 | 2/2017 | Babbage et al. |
| 2017/0280317 | A1 | 9/2017 | Tagg et al. |
| 2018/0077666 | A1 | 3/2018 | Chastain et al. |

FOREIGN PATENT DOCUMENTS

| EP | 2874420 | A1 | 5/2015 | |
| GB | 2513134 | A | 10/2014 | |
| WO | 2011057668 | A1 | 5/2011 | |
| WO | 2011094652 | A1 | 8/2011 | |
| WO | 2016207316 | A1 | 12/2016 | |
| WO | 2017092968 | A1 | 6/2017 | |
| WO | 2018141665 | A1 | 8/2018 | |
| WO | WO2019057986 | A1 * | 3/2019 | ......... H04L 61/6054 |

OTHER PUBLICATIONS

International Search Report and Written Opinion dated Dec. 8, 2020, for PCT Application No. PCT/EP2020/077274.

* cited by examiner

NETWORK CONNECTIVITY

CROSS-REFERENCE TO RELATED APPLICATIONS

This application is a continuation of International Application No. PCT/EP2020/077274, filed Sep. 29, 2020 which claims priority to UK Application No. GB 1914103.5, filed Sep. 30, 2019, under 35 U.S.C. § 119(a). Each of the above referenced patent applications is incorporated by reference in its entirety.

BACKGROUND

Field of the Invention

The present invention relates to telecommunications and in particular to a mobile network authentication to obtain temporary bootstrap connectivity.

Description of the Related Technology

Generally, Internet of Things (IoT), Machine to Machine (M2M), and consumer devices are arranged to use a Universal Integrated Circuit Card (UICC) or, in recent implementations, an embedded Universal Integrated Circuit Card (eUICC), also referred to as embedded Subscriber Identification Module (eSIM), an integrated Universal Integrated Circuit Card (iUICC) or a software-based SIM (soft SIM) for purposes of authentication to a Mobile Network Operator (MNO) or to a Mobile Virtual Network Operator (MVNO) and access the services provided by said network. The UICC is in the form of a small card that can be inserted and removed from the device. The eUICC is also a small card that is inserted into devices in a non-removable way. The iUICC consists of a system-on-chip solution in which the UICC capabilities run on the chipset. The soft SIM comprises a collection of software applications and data that performs all the functionality of a SIM card but does not reside in any kind of secure data storage or use a secure processor and is, instead, stored in the memory and processor of the communications device itself (i.e. there is no SIM hardware).

Within the present description, a network access element is an entity that allows network authentication and access. This entity may be included in a UICC, an eUICC, an iUICC or a soft SIM that can be included in IoT devices, M2M devices, or other devices.

In the cases of UICC, eUICC, iUICC, and soft SIM, the authentication and access to services provided by a mobile network may be performed through Remote SIM Provisioning, that is, the downloading, installing and enabling, of a profile Over The Air (OTA).

The presence of network access elements such as UICCs, eUICCS, iUICCs or soft SIMs in IoT devices, M2M devices, and other devices is increasing, and it may be possible to provide connectivity out of the box. In order to do so, a network access element may use a pre-configured provisioning profile to access a marketplace and a Remote SIM Provisioning (RSP) platform without the need for WIFI connection.

The marketplace and RSP platform may enable the user to seamlessly purchase a connectivity plan from its provider of choice, download the network access element configuration thus enabling cellular connectivity. This may be achieved through the following steps:

1—Device boot up upon unboxing,
2—Device establishes limited connectivity using a pre-configured provisioning profile,
3—User accesses a marketplace and purchases a plan,
4—Device downloads an operational profile from the RSP platform,
5—Device establishes full connectivity using the new operational profile.

The network access element identifies a subscription, either an IoT device, an M2M device, or a mobile device, through an International Mobile Subscriber Identity (IMSI). The IMSI is a globally routable identity assigned to an operator, which is globally unique to allow signalling routing between operators.

The IMSI has a maximum of 15 digits, composed of several fields. The initial part is comprised of six digits in the North American standard and five digits in the European standard: IMSI=MCC (3)+MNC (2/3)+MSIN (9).

A full IMSI range allows for 10.000 Million IMSIs or active individual customer SIMs.

When using sponsored roaming agreements, it is common for an operator to assign sub ranges from their global range to a partner operator so that signalling can be delivered to the partner operator. Sub ranges are then identified by the IMSI Range Prefix, which can have varying length. Below the IMSI Range Prefix is referred to as the Prefix Digits.

IMSI Prefix=MCC(3)+MNC(2/3)+Prefix Digits(variable)
E.g.: IMSI=234(3)+250(3)+PP(2)+xxxxxxx (7)

One potential way of providing connectivity out of the box, as described above, may require every single IoT, M2M and other consumer device to be configured with a working network access element profile at manufacture, which requires a very large number of IMSIs to be allocated. This scenario may lead to an increased demand for IMSIs and possibly to the exhaustion of the global IMSI numbering reserve.

However, depending on the type of device and usage profile, it is possible that several devices will never use the provisioning profile and associated IMSI either because they never use the network access element capability or use it over WIFI access.

Therefore, it is desired to more efficiently manage IMSI allocation in order to optimise the use of the resource.

The prior art document WO/2017/092968 discloses an arrangement for mobile network authentication through a first and second temporary subscription identifier and associated data. The proposed method does not constitute an optimal solution to the above identified problem of IMSI limitation and efficient management of IMSI allocation because it requires the use of fully functional IMSIs that have to be pre-provisioned to the network access element, more specifically, a set of first and a set of second temporary subscription identifiers have to be pre-provisioned. Consequently, IMSIs will be allocated with the possibility of never being used because the user will choose to resort to WIFI access.

The prior document U.S. Pat. No. 9,940,141 discloses a method to select a bootstrap eSIM electing from among a number of "bootstrap eSIMs" stored on a network access element included in a mobile device in order to optimise the selection process according to the current location of the device and prevent incurring in international rates instead of the cost of local rates charged in the current location. Although optimising the use of IMSIs according to the location of the device, this method does not solve the above identified problem seeing that a number of IMSIs have to be pre-provisioned to the eSIM.

SUMMARY

According to a first aspect of the present invention, there is provided a selection management method for obtaining temporary bootstrap connectivity for a host device comprising a network access element, the method comprising:
  receiving location information;
  performing a selection operation to select an International Mobile Subscriber Identity, IMSI, for obtaining temporary bootstrap connectivity, the selection operation being configured to select one of a first plurality of IMSIs in a first location and one of a second, different, plurality of IMSIs in a second location, wherein each of the first plurality of IMSIs includes a first predetermined value for at least a first portion of each respective IMSI and each of the second plurality of IMSIs includes a second, different, predetermined value for at least the first portion of each respective IMSI; and
  attempting to register with the network using the selected IMSI,
  wherein the selection operation comprises:
  a first preconfigured selection characteristic constraining the selection to one of the first plurality of IMSIs based on the location information; and
  a second preconfigured selection characteristic providing a variable selection from the first plurality of IMSIs.

This may allow IMSIs for use in obtaining temporary bootstrap connectivity to be used and re-used. An IMSI need not be pre-provisioned to a network access element for exclusive use with that network access element. This may provide more efficient use of the available ISMIs and reduce wastage of IMSIs.

According to a second aspect of the present disclosure there is provided a network access element for obtaining temporary bootstrap connectivity for a host device, the network access element comprising:
  at least one processor; and
  at least one computer-readable storage comprising instructions which, when executed by the at least one processor, cause the at least one processor to:
  receive location information;
  perform a selection operation to select an IMSI for obtaining temporary bootstrap connectivity, the selection operation being configured to select one of a first plurality of IMSIs in a first location and one of a second, different, plurality of IMSIs in a second location,
  wherein each of the first plurality of IMSIs includes a first predetermined value for at least a first portion of each respective IMSI and each of the second plurality of IMSIs includes a second, different, predetermined value for at least the first portion of each respective IMSI; and
  attempt to register with the network using the selected IMSI,
  wherein the selection operation comprises:
  a first preconfigured selection characteristic constraining the selection to one of the first plurality of IMSIs based on the location information; and
  a second preconfigured selection characteristic providing a variable selection from the first plurality of IMSIs.

According to a third aspect of the present disclosure there is provided a host device comprising a network access element according to the second aspect of the present disclosure.

According to a fourth aspect of the present disclosure there is provided a network node for providing temporary bootstrap connectivity, the network node being configured to:
  receive a registration request from a host device comprising a network access element, the registration request comprising an IMSI selected using a method according to the first aspect of the present disclosure;
  identify the IMSI as a temporary IMSI; and
  establish temporary bootstrap connectivity with the host device.

According to a fifth aspect of the present disclosure, there is provided a selection management method for obtaining temporary bootstrap connectivity, the method comprising:
  a host device comprising a network access element, using a limited connectivity International Mobile Subscriber Identity, IMSI, stored in the network access element to request to attach to a network;
  receiving a response from the network with location information associated with the network access element;
  selecting an IMSI prefix from an IMSI prefix database;
  generating a temporary IMSI using the selected IMSI prefix;
  determining a set of authentication keys; and
  attempting to register with the network using the temporary IMSI.

Further features and advantages of the invention will become apparent from the following description of preferred embodiments of the invention, given by way of example only, which is made with reference to the accompanying drawings.

DETAILED DESCRIPTION

Certain examples described herein provide temporary IMSIs that can be allocated for purposes of authentication and access to limited connectivity provided by a mobile network. This may allow an operational profile that has full network connectivity to be obtained. Alternatively, a bootstrap profile may be provided to, then, access an RSP platform to purchase a connectivity plan from a given provider. The limited connectivity provided by the temporary IMSIs may also be used for purposes of receiving a new IMSI that is outside of the range of the temporary IMSIs. The present solution may overcome the state-of-the-art limitations as it does not require pre-provisioning of fully functional IMSIs to network access elements. Herein is considered an embodiment in which the implementation is carried out by a network access element included in a host device.

Figure 1:
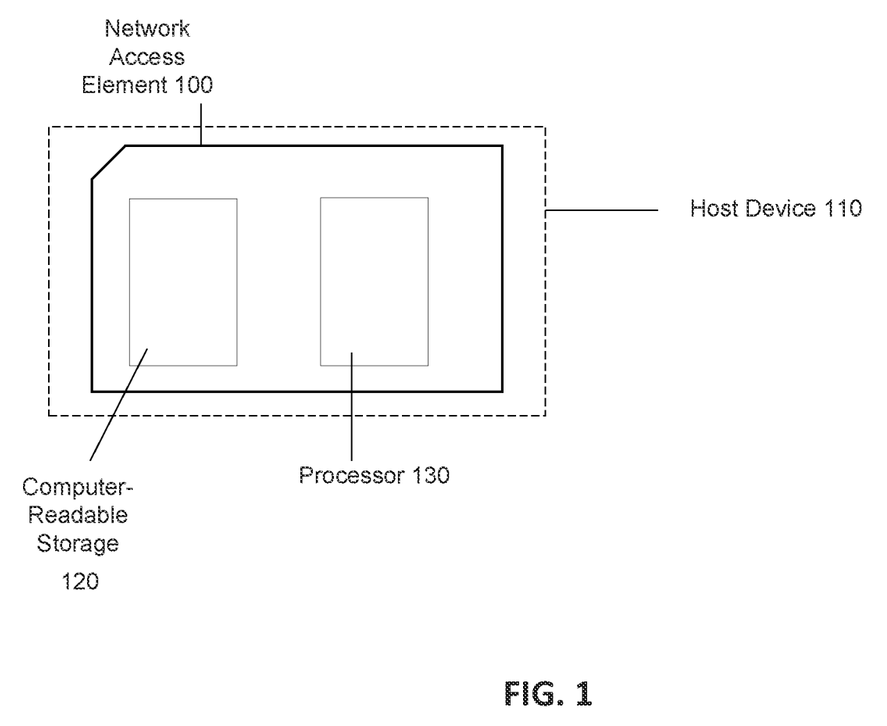
FIG. 1 is a schematic diagram illustrating a host device comprising a network access element according to an example.

FIG. 1 illustrates a network access element 100 included in a host device 110. As shown, the network access element 100 comprises a least one computer-readable storage 120. In some examples, this may be referred to as a computer readable storage medium. However, it will be appreciated that the at least one computer-readable storage 120 may be a physical storage medium or may be a virtualised storage. The at least one computer readable storage 120 may comprise instructions which, when executed by at least one processor 130, cause the at least one processor 130 to perform a selection management method for obtaining temporary bootstrap connectivity for a host device comprising the network access element 100. The selection management method will be described below in relation to FIG. 2.

The network access element 100 may comprise a UICC, an eUICC, an iUICC or a soft SIM. In some examples, the methods described herein may be implemented by either a UICC or an eUICC. In some examples, the host device 110 may comprise a consumer device, or a machine or object in an IoT or M2M context. In some examples, the host device may be a mobile device, for example a smart telephone or tablet computer. In other examples, the host device may be fixed, for example an appliance in a home or industrial setting.

The network access element 100, shown in FIG. 1, comprises at least one processor 130. The at least one processor 130 may be communicatively coupled to the at least one computer-readable storage 120 and may be configured to execute instructions stored on the at least one computer-readable storage 120. The instructions stored on the at least one computer-readable storage 120, when executed by the processor 130, may cause the at least one processor 130 to perform a selection management method for selecting a specific temporary IMSI 2 that will be allocated to the network access element 100. In some examples, the temporary IMSI may be used for purposes of obtaining temporary bootstrap connectivity. The processor 130 may possess proactive capacity in the sense that it is able to interact directly with external elements and cause the network access element 100 to send proactive commands to a network, including data for purposes of identification or authentication to a network, and it is configured to execute the selection management method as will be described with respect to FIG. 2.

Figure 2:
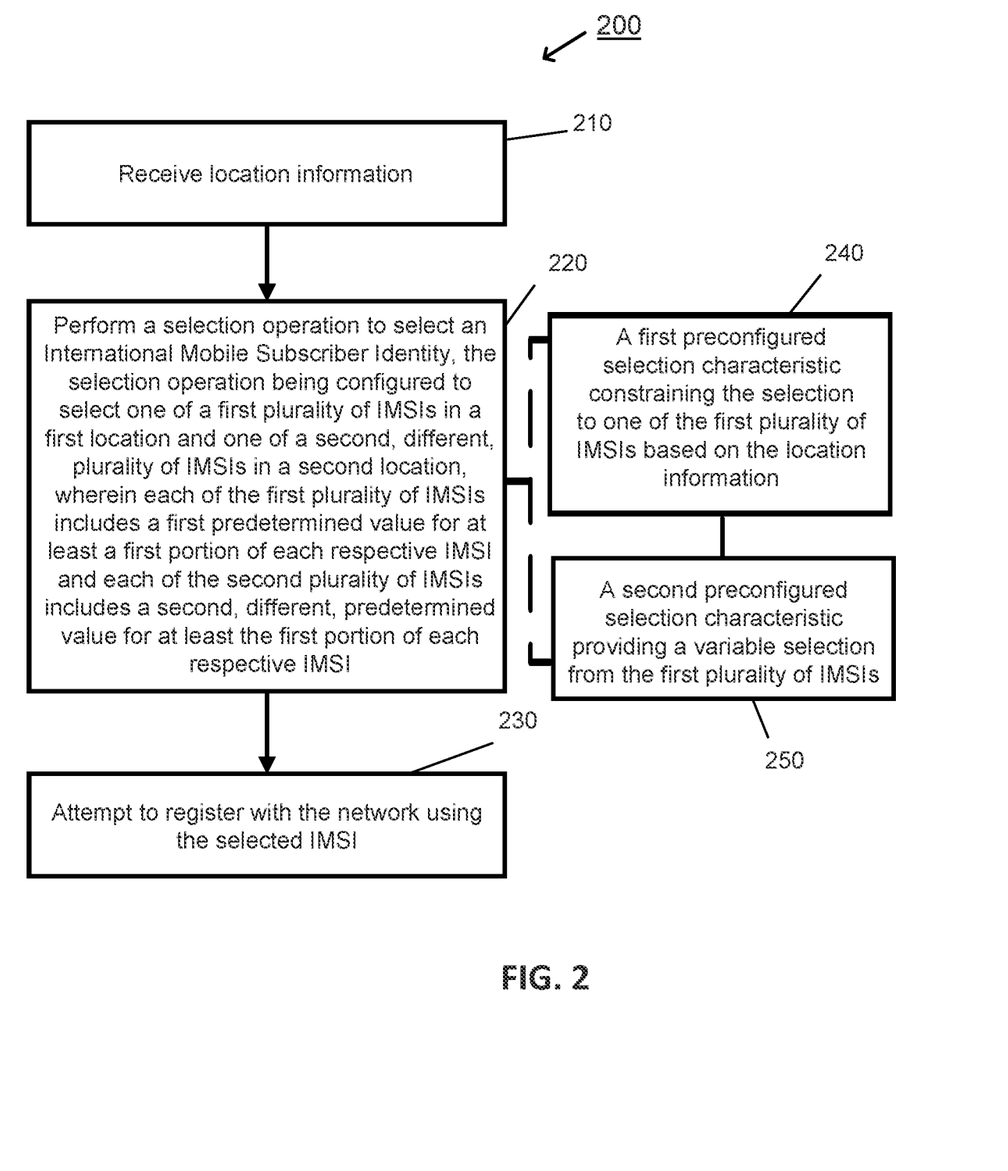
FIG. 2 is a flow diagram illustrating a method according to an example.

FIG. 2 illustrates a flow diagram of a selection management method 200 for obtaining temporary bootstrap connectivity for a host device 110 comprising a network access element 100. The method 200 may be triggered upon boot up of a host device 110 to register with a network to obtain temporary bootstrap connectivity. At block 210, the method 200 comprises receiving location information. Location information may be received by the host device 110 in any of a plurality of ways. In some examples, the location information is received using satellite communication, such as using the Global Positioning System (GPS). The host device 110 may comprise any suitable communications devices for receiving location information. The communications device may receive location information over WiFi, Bluetooth, Infrared, or any other suitable communications channel. In some cases, a limited connectivity IMSI may be used to obtain location information from the network. For example, a synthetically valid IMSI which is not intended to actually register the host device 110 with a network may be used. A synthetically valid IMSI, which may also be called a limited connectivity IMSI, may be used in a registration message. Rather than register the host device 110 with the network, the network may identify the registration request based on the limited connectivity IMSI and may respond with location information. The location information is associated with a location of the network access element. If the host device does not receive a response with location information from the network then it may reattempt to register to said network, using the limited connectivity IMSI.

At block 220, the method 200 comprises performing a selection operation to select an International Mobile Subscriber Identity (IMSI) for obtaining the temporary bootstrap connectivity. The selection operation may be configured to select one of a first plurality of IMSIs in a first location and one of a second, different, plurality of IMSIs in a second location. Each of the first plurality of IMSIs includes a first predetermined value for at least a first portion of each respective IMSI. Each of the second plurality of IMSIs includes a second, different, predetermined value for at least the first portion of each respective IMSI. For example, the first portion of an IMSI may be dependent on a location of the network access element 100. The first portion of an IMSI may comprise a Mobile Country Code (MCC). The first portion of an IMSI may comprise a Mobile Network Code (MNC). A combination of the MCC and the MNC may be used to identify the network which is to be accessed based on the location of the network access element 100.

At block 230, the method 200 comprises attempting to register with the network using the selected IMSI. In this way, the host device 110 comprising the network access element 100 may select an IMSI which can be used temporarily to access bootstrap connectivity to the network. This may prevent a network access element 110 from being pre-provisioned with either a bootstrap profile or a fully operational profile. Where a network access element 100 is pre-provisioned with a functional bootstrap profile, and hence an operational IMSI, the bootstrap profile may not be used. For example, it may be possible with some host devices 110 comprising network access elements 100 to connect the host device to a network via Wi-Fi in order to download firmware upgrades or to purchase data plans. If a pre-provisioned bootstrap profile is not used then the IMSI will be wasted. A process of attempting to register with the network using the selected IMSI will be described later with respect to FIG. 5.

Blocks 240 and 250 of the flow diagram shown in FIG. 2 provide further detail regarding the selection method 200. As shown at block 240, the selection operation comprises a first preconfigured selection characteristic constraining the selection to one of the first plurality of IMSIs based on the location information. In this way, an appropriate IMSI may be selected comprising a suitable MCC and MNC based at least on the location of the network access element 100. At block 250, it is specified that the selection operation comprises a second preconfigured selection characteristic providing a variable selection from the first plurality of IMSI.

In some examples, the first preconfigured selection characteristic comprises performing the selection operation to select at least a first portion of the selected IMSI from a database. The first portion of the IMSI may comprise an MCC, an MNC, and one or more further digits identify a subrange of the range of IMSIs. The subrange defined by the one or more further digits in this context may define a partner, such as a carrier which rents a portion of IMSI range owned by another carrier network. The location information may comprise, or may be used to determine, an MCC. The database may be searched using the MCC to determine the MNC and/or the further digits. Selecting at least a first portion of the selected IMSI from the database may comprise selecting a first entry defined in a first entry list corresponding to the first plurality of IMSIs. The entries in the database may be referred to as IMSI prefixes. In other examples, the selection of the at least a first portion may be performed using a randomized rotation comprising as variables the MCC, the MNC, and a set time range.

The second preconfigured selection characteristic comprises performing the selection operation to select at least a second portion of the selected IMSI from a range of allowable values. In some cases, there may be particular IMSIs which are reserved for particular uses and so these may not be selected. Some IMSIs may be used to provide operational services to other network access elements and so may be not be used to provide temporary bootstrap connectivity to the host device 110 comprising the network access element 100. In some cases, a range of IMSI may be reserved for different carriers and so the range of allowable values used in the second preconfigured selection characteristic may comprise IMSI relating to the network to which the host device is to be registered with.

In some implementations, the selection operation comprises a third preconfigured selection characteristic performing the selection operation to select at least a third portion of the selected IMSI to indicate a temporary IMSI. In this way, one or more digits of the IMSI may be used to indicate that the selected IMSI is a temporary IMSI. This may be useful when communicating with the network. For example, the network may identify the IMSI as a temporary IMSI and so may use this as an indication to provide a bootstrap profile to the host device 110. In some examples, the one or more digits which are used to indicate a temporary IMSI may be used to identify a range of IMSI which are to be used as temporary IMSI for the purposes described herein. The position of the one or more digits which indicate a temporary IMSI may be at any suitable position within the IMSI. The position of the one or more digits in the IMSI may also define the number of allowable IMSIs which may be used as temporary IMSIs.

The selection operation to select the at least a second portion of the selected IMSI may comprise selecting at least a portion of an International Mobile Equipment Identity (IMEI) associated with the host device 110. A host device may be associated with a unique IMEI which identifies that device. In this case, using at least part of the IMEI as the selected IMSI may reduce a risk of two different host devices using the same IMSI to try and connect to the network at the same time to get a temporary bootstrap connectivity. A network access element 100 comprised in a host device 110 may access and select at least part of the IMEI associated with host device as the at least a second portion of the selected IMSI.

In some examples, the selection operation to select the at least a second portion of the selected IMSI may be sensitive to a likelihood that a further host device will select the same IMSI. The selection operation to select the at least a second portion of the IMSI may select seven digits. A calculation may be performed to assess a probability of conflict in use of the selected IMSI in the range of temporary IMSIs. The calculation may involve using a number of host devices (i.e. a number of host devices which have been deployed, which have been deployed in a particular location, or which may be attempting to connect to the network), a number of available IMSIs, a use time of IMSIs, a type of product (i.e. a type of host device, or a type of mobile connectivity package), a number of existing MCCs, a number of existing MNCs, and countries. The at least a second portion of the IMSI may be the right most digits, for example, the right most seven digits of the IMSI.

In an example of the method 200, the selected IMSI may be used to download a bootstrap profile, and the bootstrap profile may be used to download a further IMSI for ongoing use. Once the further IMSI has been provisioned, the selected IMSI may be released and so can be used by other host devices to perform similar functions. A bootstrap profile may be a profile with which the host device 110 can connect with the network for the purposes of downloading software, firmware, updates, and receiving data plans (i.e. a host device 110 which has a bootstrap profile may access the network to browse and purchase a data plan to provide operational services to the host device 110). Once a data plan, or an operational profile has been selected (either by the user of the host device 110 or by some process at the network) a further IMSI may be provisioned to the host device 110 to provide these operational services. This releases the selected IMSI and allows a further host device to select that IMSI to also get a further IMSI. In this way, these temporary IMSI may be used and re-used by multiple host devices 110 and so the reserve of available IMSIs may not be depleted due to the pre-provisioning of bootstrap profiles (and associated IMSIs) to host devices during manufacture.

In other examples, the method 200 may comprise using the selected IMSI to download an active profile for ongoing use. In some examples, the profile to be used by the host device 110 may be predetermined. In this case, the selected IMSI may be used to download the active profile without having to first provide bootstrap connectivity.

The attempt to register the host device 110 with the network, this may be the case where for example two different host devices are using the same selected IMSI to connect to the network. In this, if the attempt to register with the network using the selected IMSI is unsuccessful, the method 200 may comprise attempting to register with a further network using the selected IMSI. Alternatively, if the attempt to register with the network using the selected IMSI is unsuccessful, the method may comprise performing a selection operation to select a further IMSI for obtaining the temporary bootstrap connectivity.

Figure 3:
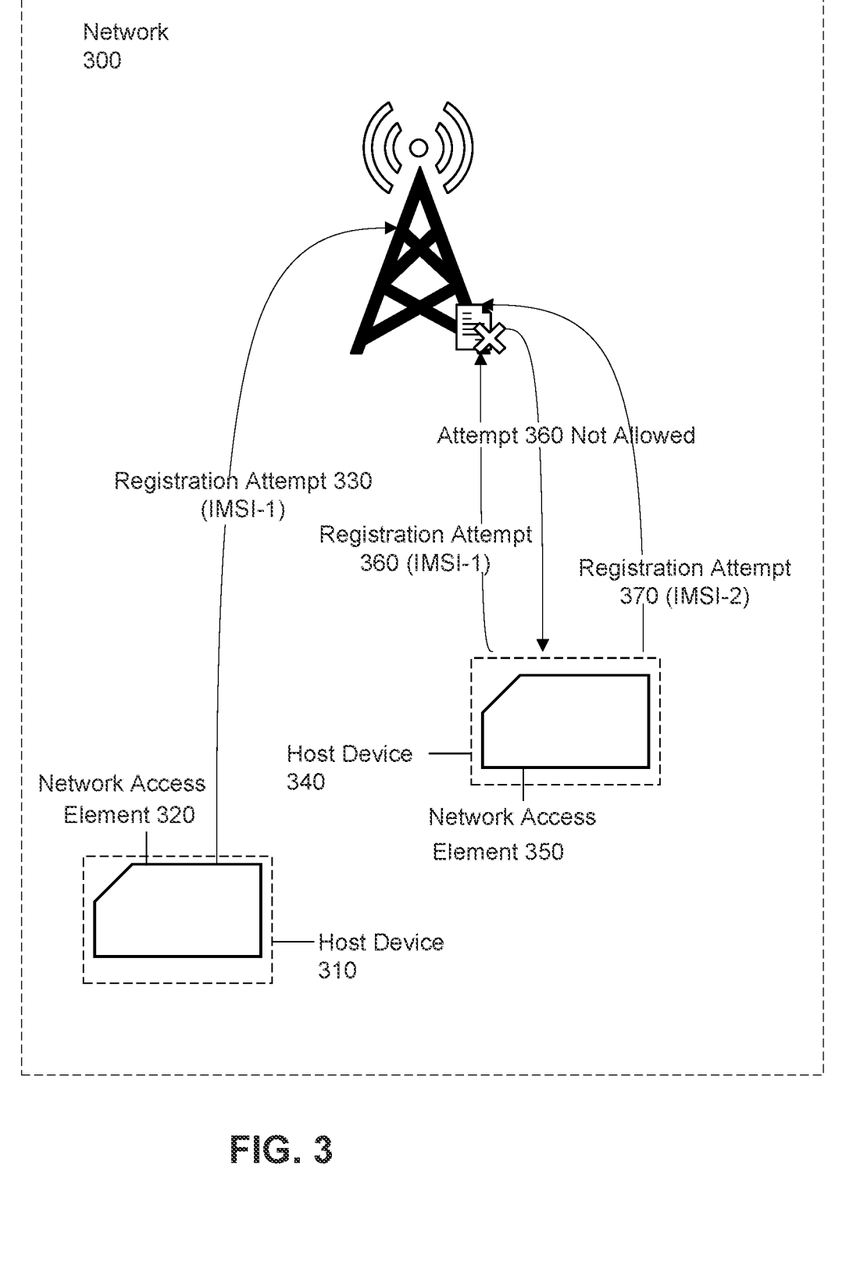
FIG. 3 is a schematic diagram illustrating a registration attempt according to an example.

FIG. 3 shows schematically an example of a process for attempting to register with the network wherein the attempt to register with the network is unsuccessful. A host device 310 comprising a network access element 320 may use a selected IMSI-1 to attempt to register 330 with a network 300. This attempt may be successfully processed and the host device 310 may connect to the network using the IMSI-1. Simultaneously, or shortly thereafter, if the IMSI-1 is still in use and a further host device 340 comprising a network access element 350 attempts to register 360 with the network 300 using the same IMSI-1, this attempt may fail 360. Each IMSI is unique to a registration between one host device and the network 300 and so no two host devices can simultaneously use the same IMSI-1, although if host device 310 were to stop using IMSI-1 then host device 340 could use IMSI-1. However, in this case, following a failed registration attempt, host device 340 comprising network access element 350 may perform a selection operation to select a further IMSI, IMSI-2 and may attempt to register 370 with the network 300 using IMSI-2.

The selection operation to select a further IMSI may comprise selecting a different at least a first portion of the IMSI. For example, where the at least a first portion of the IMSI is selected from a database, selecting a further IMSI may comprise selecting at least a first portion of the further IMSI from a next sequential entry in the database. In other examples, the selection may be randomized. In some examples, at least a first portion of the original IMSI, IMSI-1, may be entered into a list of portions of IMSI which should not be used to prevent accidental reselection of the same IMSI.

Returning to FIG. 1, a network access element 100 may be provided for obtaining temporary bootstrap connectivity for a host device 110. The network access element 100, may comprise at least one processor 130 and at least one computer-readable storage 120. The at least one computer-readable storage 120 may comprise instructions to perform a selection management method as described above in relation to FIG. 2. The at least one computer-readable storage 120 may comprise instructions which, when executed by the processor, cause the processor to, if the attempt to register with the network using the selected IMSI is unsuccessful, perform a further selection operation to select a further IMSI for obtaining temporary bootstrap connectivity, and attempt to register with the network using the selected further IMSI. Alternatively, following an unsuccessful registration attempt, the instructions may cause the at least one process to attempt to register with a further network using the selected IMSI. When attempting to connect to the network, the host device may send a registration message with an IMSI to a Visited Public Land Mobile Network (VPLMN) such that the message is routed to a Home Public Land Mobile Network (HPLMN). Attempting to register with a further network may comprise attempting to register with a further VPLMN.

The network access element may comprise storage storing a database. The storage may be the same as the computer-readable storage comprising instructions for implementing the methods as described herein, alternatively, the storage may be a separate storage. The database may comprise a plurality of entries, each entry being suitable for being selected as at least a first portion of the selected IMSI. The database may be implemented as a linked list. The entries in the database may be grouped according to an MCC and/or and MNC comprised in the portion of the IMSI. The first pre-configured selection characteristic may comprise performing the selection operation to select at least a first portion of the selected IMSI from the database. For example, upon receipt of location information, a search may be performed on the database to identify entries comprising suitable MCCs and/or MNCs. At least a first portion of the selected IMSI may then be selected from the entries comprising suitable MCCs and/or MNCs.

As discussed above, the selection operation may comprise a third preconfigured selection characteristic performing the selection operation to select at least a third portion of the selected IMSI to indicate a temporary IMSI. For example, of the entries in the database comprising suitable MCCs and/or MNCs, one or more digits after these values in the IMSI may be selected and used to identify any IMSIs in this range as being used for temporary IMSIs for obtaining temporary bootstrap connectivity for the host device 110.

In some examples, the database may be pre-provisioned, or pre-loaded, onto the network access element 100 before the network access element 100 is distributed (i.e. sold to consumers). The database may be updated and maintained while the host device is registered with a network such that if a connection is lost, or if the device is to be re-registered then the database may comprise up to date IMSI data for selecting an IMSI. In other examples, the database nay be updated via other suitable communication channels, for example over Wi-Fi or Bluetooth.

The storage may also comprise the limited connectivity IMSI for communicating with the network to obtain location information as described above. The limited connectivity IMSI may be a specific IMSI which is pre-provisioned to a plurality of host devices. Alternatively, there may be a plurality of limited connectivity IMSIs which are used as limited connectivity IMSIs for host devices to receive location information from networks when using said limited connectivity IMSIs to attempt to register with the networks. The plurality of limited connectivity IMSIs may be pre-provisioned to networks access elements during manufacture either sequentially or randomly.

In an example, there is provided a network node for providing temporary bootstrap connectivity. The network node may be configured to receive a registration request from a host device comprising a network access element, the registration request comprising an IMSI selected using a method as described in the preceding description. The network node may be configured to identify the IMSI as a temporary IMSI, and establish temporary bootstrap connectivity with the host device.

Figure 4:
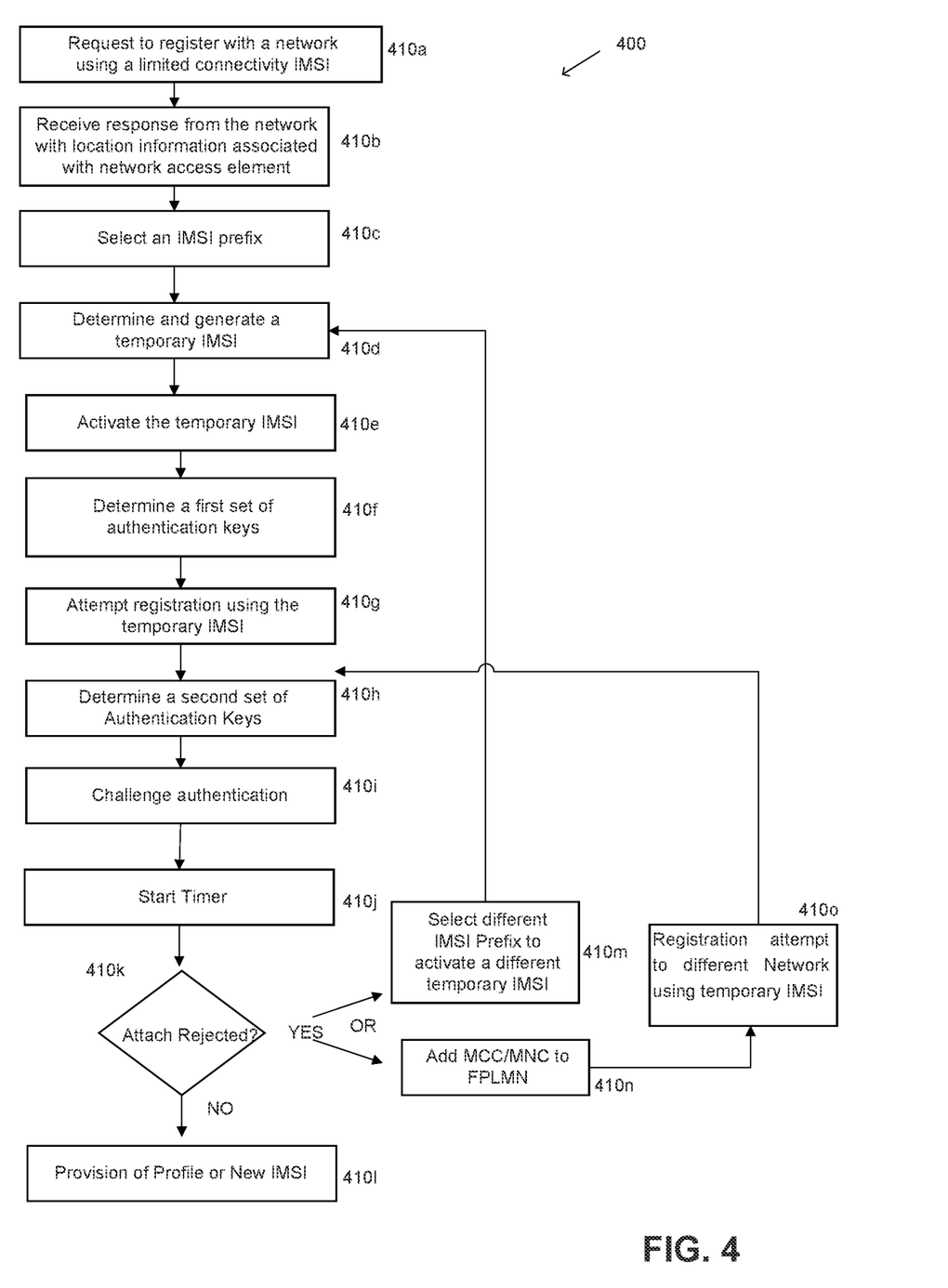
FIG. 4 is flow diagram illustrating a specific example of a method.

FIG. 4 shows a flow diagram of a more specific example of a selection management method 400 according to examples. At block 410a the method comprises requesting to register with a network using the limited connectivity IMSI. As described above, this registration attempt is configured to illicit a response from the network comprising location information. At block 410b, the method 400 comprises receiving a response from the network with location information associated with the network access element. In the case where a response is not received from the network, the host device may reattempt registration with the network using the limited connectivity IMSI.

At block 410c, the method 400 comprises selecting an IMSI prefix. The IMSI prefix may correspond to the at least a first portion of the selected IMSI as described above with respect to FIG. 2. Selecting the IMSI prefix may comprise searching a database, which is stored in the network access element. Selecting the IMSI prefix may comprise selecting a first IMSI prefix in a first IMSI prefix list comprising IMSI prefixes which are suitable for the host device based at least on the location of the host device.

At block 410d, the method 400 comprises determining and generating a temporary IMSI. This may comprise the selecting of at least a second portion of the selected IMSI, as described above, and generating the temporary IMSI based on the IMSI prefix and a second portion of the IMSI, which may be variable. At block 410e, the method 400 comprises activating the temporary IMSI. At block 410f, the method 400 may comprise determining a first set of authentication keys. This may comprise using the temporary IMSI and the MCC corresponding to the network to determine the authentication keys.

At block 410g, the method 400 comprises attempting registration using the temporary IMSI. A VPLMN may receive this registration request and may route the request to the HPLMN. At block 410h, a network node of the HPLMN may determine a second set of authentication keys. The registration attempt may then be routed to an authentication and subscription management node (ASM node). The ASM node may be a Home Subscriber Server (HSS), Home Location Register (HLR), Authentication Center (AuC), or other suitable network element.

At block 410i, the method 400 comprises an authentication challenge to the network access element. A timer may be started to determine whether the attempt to register is successful, as can be seen at block 410j of the method 400. At block 410k, the method 400 comprises, if the host device successfully attaches to the network, moving to block 410l where a profile is provisioned (either a bootstrap profile or an operational profile), or a new IMSI that is outside of the range of temporary IMSIs is downloaded.

If the host device is unable to attach to the network either, the MCC and/or MNC of the network is added to a forbidden public land mobile network list, shown at block 410*n*, and a new registration attempt is performed with a different network, or, as shown at block 410*m*, a different IMSI prefix is selected to activate a different temporary IMSI.

According to another embodiment (not represented graphically), the network access element included in the host device comprises, a pre-provisioned IMSI and various authentication keys and this IMSI is intended to actually register with a network to obtain temporary connectivity to download a profile (either bootstrap profile or operational profile) or a new IMSI that is outside of the range of the temporary IMSIs. The same pre-provisioned IMSI and authentication keys are preloaded on multiple network access elements at the same time. The authentication keys to perform the registration attempt with the network are selected based on the MCC, MNC and the pre-provisioned IMSI. In case the attempt to register does not receive an accepted response from the network, reattempting to register with said network with different authentication keys may be performed until receiving an accepted response. The network access element implementing this method can be a UICC, an eUICC, an iUICC or a soft SIM.

According to another embodiment (not represented graphically) the network access element included in the host device may comprise multiple IMSIs with a single authentication key and these IMSIs are intended to actually register with a network to obtain temporary connectivity to download a profile (either bootstrap profile or operational profile) or a new IMSI that is outside of the range of the temporary IMSIs. The same pre-provisioned IMSIs and single authentication key are preloaded on multiple network access elements at the same time. The IMSI to use to perform the registration attempt with the network may be selected based on the MCC, MNC and a set time range. The IMSI may be selected according to a rotation pool that is sequential, or according to a randomized rotation comprising as variables the MCC, MNC and a set time range. In case the attempt to register does not receive an accepted response from the network, the network access element may trigger a reattempt to register with said network with a different IMSI until receiving an accepted response. The network access element implementing this method can be a UICC, an eUICC, an iUICC or a soft SIM.

Figure 5:
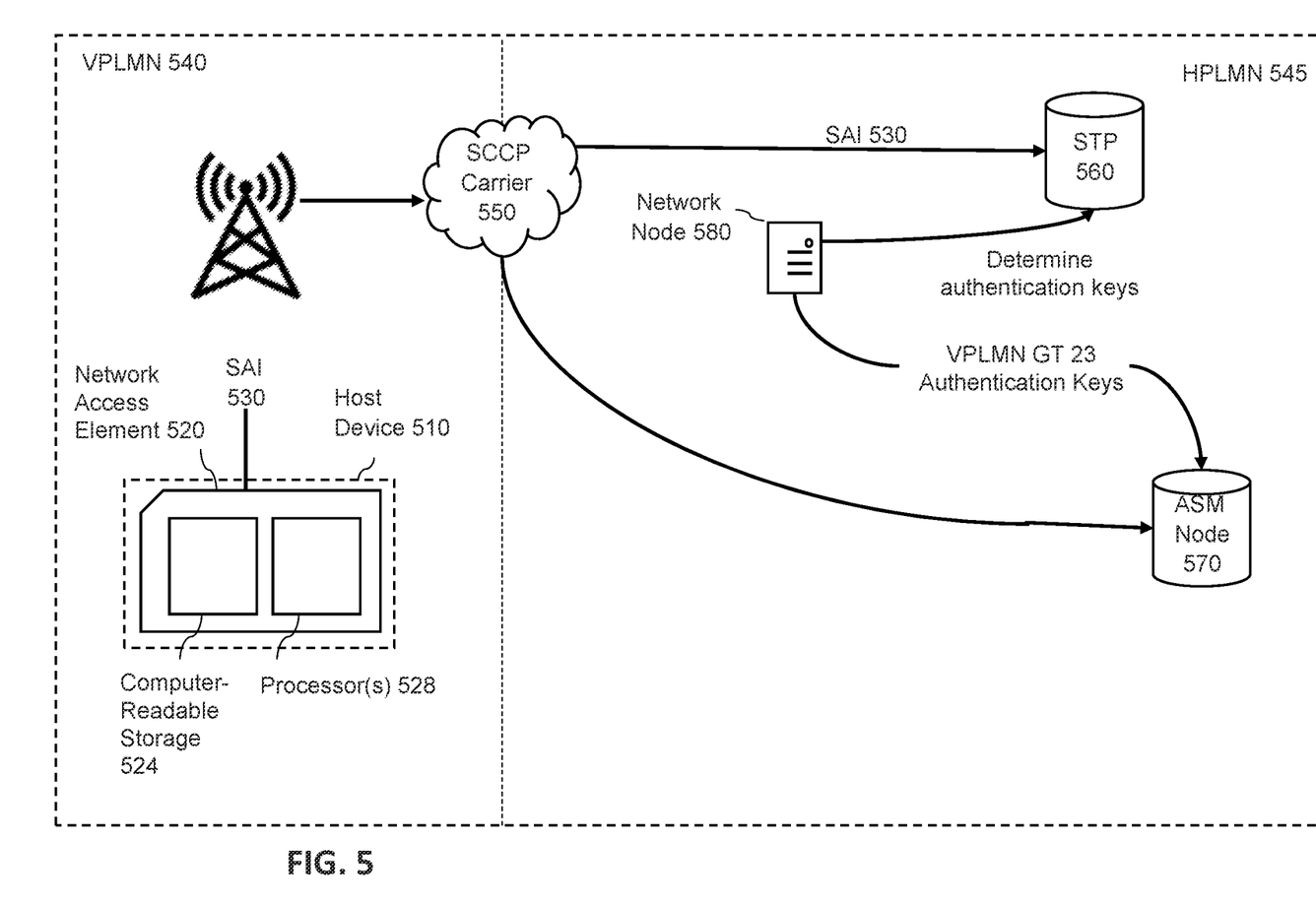
FIG. 5 is a schematic diagram illustrating a registration attempt according to an example.

FIG. 5 shows schematically a simplified scheme of an attempt to register with an MVNO to obtain temporary bootstrap connectivity according to an example. This may be for the purpose of downloading a profile (either bootstrap profile or an operational profile), which may include downloading an IMSI that is not in the first or second pluralities of IMSIs, for a consumer device. A host device 510 comprising a network access element 520 is provided. The network access element 520 comprises at least on computer-readable storage 524 and at least one processor 528. Upon boot up of the host device 510 a selection management method according to the example shown in FIG. 2 may be performed. Attempting to register the host device 510 with the network may comprise sending a registration message 530 comprising the selected IMSI to a VPLMN (for example, a Service Area Identifier (SAI) may be made on the VPLMN). The SAI may comprise a Calling Global Title: VPLMN GT and may be routed, by a Signalling Connection Control Part Carrier 550 to a Signal Transfer Point (STP) 560 and subsequently to an ASM node 570.

Once the SAI 530 has arrived to the HPLMN 545, a set of authentication keys may be calculated to match a set of authentication keys generated by the network access element 520 to authenticate registration. The HPLMN 545 comprises a network node 580 that may be configured to recognise a specific IMSI range corresponding to temporary IMSIs which can be used for obtaining temporary bootstrap connectivity. The network node may recognise the selected IMSI as one such IMSI and may determine the set of authentication keys which are calculated in the HPLMN. The authentication may be determined from the IMSI and the MCC as determined from the Calling Global Title.

The network 545 may respond to the SAI and the network access element 520 may be challenged in order for the authentication to be completed. The ASM node 570 may be populated with the network access element 520 location.

Once the network access element 520 is registered with the network and has a temporary bootstrap profile, a profile (either a bootstrap profile or an operational profile) may be delivered, for example via OTA or other suitable means, to the network access element 520 included in the host device 510. This may include downloading an IMSI that is not in the first or second pluralities of IMSIs The network access element 520 may connect to a remote SIM provisioning platform via the above method in order to download a bootstrap profile or an operational profile. For example, by downloading an IMSI that is not in the first or second pluralities of IMSIs. Alternatively, the network access element 520 may be included in a host device 510 which communicates using M2M communication. In which case, the network access element 520 and the host device 510 may provision a bootstrap or operational profile by connecting to other devices. Similarly, the above methods may be implemented in an IoT environment.

The examples of methods and apparatus described herein enable temporary bootstrap connectivity to be obtain through network registration using a temporary IMSI which is selected upon device boot up. This prevents the need to pre-provision IMSIs having either bootstrap profiles or active operational profiles associated with them, and hence prevents wastage of the finite number of IMSIs where a user of a device uses alternative means to download an operational profile, for example, via Wi-Fi.

The method as described above may be applicable to network access elements wherein a database is pre-provisioned to the network access element comprising a finite number of IMSIs which may be grouped according to MCC, MNC, further identifying digits in the IMSI, and/or a combination of these elements. The above examples may also be applicable to situations where the network access element is pre-provisioned (that is, provided with before being distributed to consumers) with a database comprising entries relating to a first portion of the selected IMSI and wherein the second portion of the selected IMSI may be generated, for example by selecting part of an IMEI or by some selection and/or generation rule.

In some examples a selection management method for obtaining temporary bootstrap connectivity is provided. The method may comprise: a host device comprising a network access element, using a limited connectivity IMSI, stored in the network access element to request to attach to a network; receiving a response from the network with location information associated with the network access element; selecting an IMSI prefix from an IMSI prefix database; generating a temporary IMSI using the selected IMSI prefix; determining a set of authentication keys; and attempting to register with the network using the temporary IMSI.

It is to be understood that the selection management methods as described herein may be implemented in a variety of operational environments. Including in scenarios where the host device is roaming, and in environments where the host device connects to either an MNO or an MVNO.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A selection management method for obtaining temporary bootstrap connectivity for a host device comprising a network access element, the method comprising:
    receiving location information;
    performing a selection operation to select an International Mobile Subscriber Identity (IMSI) for obtaining temporary bootstrap connectivity, the selection operation being configured to select one of a first plurality of IMSIs in a first location and one of a second, different, plurality of IMSIs in a second location, wherein each of the first plurality of IMSIs includes a first predetermined value for at least a first portion of each respective IMSI and each of the second plurality of IMSIs includes a second, different, predetermined value for at least the first portion of each respective IMSI; and
    attempting to register with the network using the selected IMSI,
    wherein the selection operation comprises:
        a first preconfigured selection characteristic constraining the selection to one of the first plurality of IMSIs based on the location information;
        a second preconfigured selection characteristic providing a variable selection from the first plurality of IMSIs; and
        a third preconfigured selection characteristic performing the selection operation to select at least a third portion of the selected IMSI to indicate a temporary IMSI.

2. The selection management method of claim 1, wherein the first preconfigured selection characteristic comprises performing the selection operation to select at least a first portion of the selected IMSI from a database.

3. The selection management method of claim 1, wherein the first portion comprises a mobile network code (MNC).

4. The selection management method of claim 1, wherein the second preconfigured selection characteristic comprises performing the selection operation to select at least a second portion of the selected IMSI from a range of allowable values.

5. The selection management method of claim 1, wherein the selection operation to select the at least a second portion of the selected IMSI comprises selecting at least a portion of an International Mobile Equipment Identity associated with the host device.

6. The selection management method of claim 1, wherein the selection operation to select the at least a second portion of the selected IMSI is sensitive to a likelihood that a further host device will select the same IMSI.

7. The selection management method of claim 1, comprising using the selected IMSI to download a bootstrap profile, and using the bootstrap profile to download a further IMSI for ongoing use.

8. The selection management method of claim 1, comprising using the selected IMSI to download an active profile for ongoing use.

9. The selection management method of claim 1, comprising using a limited connectivity IMSI to obtain the location information from the network.

10. The selection management method of claim 1, wherein if the attempt to register with the network using the selected IMSI is unsuccessful, the method comprises attempting to register with a further network using the selected IMSI.

11. The selection management method of claim 1, wherein if the attempt to register with the network using the selected IMSI is unsuccessful, the method comprises:
    performing a selection operation to select a further IMSI for obtaining the temporary bootstrap connectivity; and
    attempting to register with the network using the selected further IMSI.

12. A network node for providing temporary bootstrap connectivity, the network node being configured to:
    receive a registration request from a host device comprising a network access element, the registration request comprising an IMSI selected using a method as claimed in claim 1;
    identify the IMSI as a temporary IMSI; and
    establish temporary bootstrap connectivity with the host device.

13. A network access element for obtaining temporary bootstrap connectivity for a host device, the network access element comprising:
    at least one processor; and
    at least one non-transitory computer-readable storage comprising instructions which, when executed by the at least one processor, cause the at least one processor to:
    receive location information;
    perform a selection operation to select an IMSI for obtaining the temporary bootstrap connectivity, the selection operation being configured to select one of a first plurality of IMSIs in a first location and one of a second, different, plurality of IMSIs in a second location, wherein each of the first plurality of IMSIs includes a first predetermined value for at least a first portion of each respective IMSI and each of the second plurality of IMSIs includes a second, different, predetermined value for at least the first portion of each respective IMSI; and
    attempt to register with the network using the selected IMSI,
    wherein the selection operation comprises:
        a first preconfigured selection characteristic constraining the selection to one of the first plurality of IMSIs based on the location information;
        a second preconfigured selection characteristic providing a variable selection from the first plurality of IMSIs; and
        a third preconfigured selection characteristic performing the selection operation to select at least a third portion of the selected IMSI to indicate a temporary IMSI.

14. The network access element of claim 13, wherein the at least one computer-readable storage comprises instructions which, when executed by the at least one processor, cause the processor to, if the attempt to register with the network using the selected IMSI is unsuccessful:

perform a further selection operation to select a further IMSI for obtaining temporary bootstrap connectivity; and attempt to register with the network using the selected further IMSI.

15. The network access element of claim 13, wherein the at least one computer-readable storage comprises instructions which, when executed by the at least one processor, cause the at least one processor to, if the attempt to register with the network using the selected IMSI is unsuccessful, attempt to register with a further network using the selected IMSI.

16. The network access element of claim 13, comprising storage storing a database, the database comprising a plurality of entries, each entry being suitable for being selected as at least a first portion of the selected IMSI, and wherein the first pre-configured selection characteristic comprises performing the selection operation to select at least a first portion of the selected IMSI from the database.

17. The network access element of claim 13, wherein the second preconfigured selection characteristic comprises performing the selection operation to select at least a second portion of the selected IMSI from a range of allowable values.

18. The network access element of claim 13, wherein the computer-readable storage comprises instructions which, when executed by the at least one processor, cause the at least one processor to use the selected IMSI to download a bootstrap profile, and use the bootstrap profile to download a further IMSI for ongoing use.

19. The network access element of claim 13, wherein the computer-readable storage comprises instructions which, when executed by the at least one processor, cause the at least one processor to use the selected IMSI to download an active profile for ongoing use.

20. The network access element of claim 13, wherein the storage comprises a limited connectivity IMSI for communicating with the network to obtain the location information.

21. A host device comprising a network access element as claimed in claim 13.

22. The host device of claim 21, wherein the selection operation to select the at least a second portion of the selected IMSI comprises selecting at least part of an IMEI associated with the host device.

* * * * *